United States Patent [19]

Van Phung et al.

[11] Patent Number: 4,728,696

[45] Date of Patent: Mar. 1, 1988

[54] AMPHIPHILIC MONOMER AND HYDROPHOBE ASSOCIATIVE COMPOSITION CONTAINING A POLYMER OF A WATER-SOLUBLE MONOMER AND SAID AMPHIPHILIC MONOMER

[75] Inventors: Kien Van Phung; Syamalarao Evani, both of Midland, Mich.

[73] Assignee: The Dow Chemical Company, Midland, Mich.

[21] Appl. No.: 803,757

[22] Filed: Dec. 2, 1985

[51] Int. Cl.$^4$ .............................................. C08F 20/58
[52] U.S. Cl. .............................. 526/304; 252/8.55 R; 526/286; 526/320
[58] Field of Search ............... 526/304, 287, 288, 289, 526/274, 277, 286, 318, 320, 307, 307.2

[56] References Cited

U.S. PATENT DOCUMENTS

| | | | |
|---|---|---|---|
| 2,892,820 | 6/1959 | Stewart | 526/317.1 |
| 3,551,479 | 12/1970 | Emmons | 524/375 |
| 4,432,881 | 2/1984 | Evani | 524/375 |
| 4,463,152 | 7/1984 | Schulz et al. | 526/307.5 |
| 4,520,182 | 5/1985 | Turner et al. | 526/307.2 |
| 4,528,348 | 7/1985 | Turner et al. | 526/225 |

Primary Examiner—Christopher Henderson
Attorney, Agent, or Firm—Charles J. Enright

[57] ABSTRACT

The invention comprises a composition comprising at least one compound defined by the formula

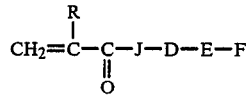

wherein R is hydrogen, $C_{1-4}$ alkyl or a group

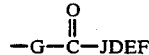

wherein G is a divalent hydrocarbyl-linking group and J, D, E and F are hereinafter defined; wherein J and E independently are divalent linking groups selected from

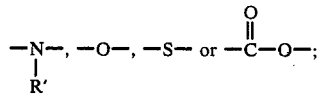

wherein R' is hydrogen or $C_{1-4}$ alkyl; D is a divalent hydrocarbyl group which lends hydrophobicity to the compound; and F is a monovalent hydrocarbyl group which lends hydrophilicity to the compound. Such compositions are useful as comonomers with water-soluble monomers such as acrylamide and acrylic acid which form water-dispersible thickening agents which are resistant to shear degradation and heat and have a broad range of salt tolerance. Aqueous solutions thickened with such copolymers are useful in enhanced oil recovery processes as fluid mobility control agents, as fracturing fluids and drilling muds as well as hydraulic fluids and lubricants in many applications.

10 Claims, No Drawings

AMPHIPHILIC MONOMER AND HYDROPHOBE ASSOCIATIVE COMPOSITION CONTAINING A POLYMER OF A WATER-SOLUBLE MONOMER AND SAID AMPHIPHILIC MONOMER

BACKGROUND OF THE INVENTION

This invention relates to hydrophobe associative compositions that increase the viscosity of aqueous media containing water-soluble electrolytes.

As taught in *Encyclopedia of Polymer Science and Technology*, Interscience Publishers, Vol. I, 192 (1964), and Kirk-Othmer, *Encyclopedia of Chemical Technology*, 3rd Ed., Vol. 20, pp. 207–230 (1982), John Wiley & Sons (both of which are incorporated herein by reference), it is known that the viscosity of an aqueous medium may be increased by the addition of a water-soluble polymer. Such water-soluble polymers include polyacrylamide, acrylamide/acrylic acid copolymer, sodium polyacrylate, carboxymethyl cellulose, hydroxyethyl cellulose, methyl cellulose, polysaccharide as well as naturally occurring gums such as guar gum and chemically modified gums such as hydroxypropyl guar gum. As a result of this thickening capability, there are many existing, as well as potential, industrial applications for aqueous media thickened with such water-swellable polymers.

Unfortunately, however, the aforementioned conventional water-soluble polymers suffer from deficiencies or limitations in actual use in such industrial applications. For example, for reasons of efficiency and economical considerations, it is common to employ very high molecular weight versions of such polymers. However, during many industrial applications, the conditions present during the practice of the application involve exposing an aqueous medium containing the high molecular weight water-soluble polymer to high shear. Such shear often causes mechanical degradation of the polymer and thus reduces the viscosity of the aqueous medium. While lower molecular weight polymers are less sensitive to shear degradation, they must be used in much higher concentrations in order to achieve the desired level of visosity.

Secondly, while ionic water-soluble polymers such as neutralized acrylamide/acrylic acid copolymer, sodium polyacrylate, polystyrene sulfonate and the like are more efficient thickeners in deionized water than their nonionic counterparts, their thickening ability is greatly reduced by the presence of water-soluble electrolytes such as sodium chloride, calcium chloride and magnesium sulfate in the aqueous medium. Such electrolytes are present in the aqueous media employed in most industrial applications, particularly those requiring the use of ground waters in subterranean formations as in enhanced oil recovery.

Finally, in many applications, the aqueous medium thickened with water-soluble polymer is exposed to temperatures in the range of 30° C. to 100° C. which normally causes reduction of viscosity. Such high temperatures are particularly common in enhanced oil recovery applications wherein the aqueous medium is pumped underground to depths of 5000 to 20,000 feet, as is common for mobility control fluids and packing fluids.

In attempts to overcome some of the aforementioned deficiencies of the conventional water-soluble polymers, it has been a common practice to cross-link the polymer in order to improve resistance to thermal as well as shear degradation. See, for example, U.S. Pat. No. 3,247,171. Such attempts have generally not been successful.

More recently, as taught in U.S. Pat. No. 3,984,333, an aqueous medium has been thickened by dissolving a block copolymer having water-soluble blocks and water-insoluble blocks in the aqueous medium. While such block copolymers apparently exhibit reasonably good resistance to shear degradation, such polymers are difficult and often impractical to prepare. More importantly, such polymers do not exhibit significant tolerance of electrolytes normally present in the aqueous media to be thickened.

While the cellulosic derivatives such as hydroxyethyl cellulose and biopolymers exhibit acceptable tolerance to the presence of electrolytes, cellulosic derivatives are generally ineffective at the low concentrations that are economical and exhibit poor thermal stability. The biopolymers such as xanthan gums exhibit acceptable thermal stability, resistance to shear degradation and electrolyte tolerance. Unfortunately, such biopolymers are generally very expensive and are susceptible to biodegradation.

U.S. Pat. No. 4,463,152 discloses a copolymer of acrylamide and a nonionic surfactant monomer such as:

wherein R is hydrophobic and n equals 1 to 60. The patent claims that these copolymers are more efficient viscosification agents than homopolymers of acrylamide and are different from hydrolyzed polyacrylamides (a copolymer of acrylamide and acrylic acid) by virtue of higher thickening ability in a concentration dependence of viscosity in a brine environment and often higher retention of viscosity in the presence of inorganic electrolytes. The patentees state that the small amount of hydrophobic or water-insoluble alkyl groups on the surfactant comonomer is believed to result in intermolecular aggregation or interaction in solution, resulting in enhanced viscosity relative to a noninteracting polymer such as a polyacrylamide. Such polymers may be limited in their tolerance of electrolyte. While the viscosity of the thickened medium increases with salt concentration to a point above a certain level of salt concentration, the aqueous medium viscosity drops off sharply, thus such polymers have limited usefulness.

U.S. Pat. No. 4,432,881 discloses a thickened aqueous medium containing a water-soluble polymer having pendant hydrophobic groups, for example, a copolymer of acrylamide and dodecyl acrylate, said copolymer being combined with a water-dispersible surfactant. The copolymer formed also suffers from lowering of viscosity as the electrolyte concentration increases beyond a certain point because gel particles are formed which do not thicken the bulk media.

In view of the aforementioned deficiencies of conventional water-soluble polymers, it is highly desirable to provide a relatively inexpensive polymer composition capable of increasing or maintaining the viscosity of aqueous media containing electrolytes. It is further desirable that said polymer exhibits thermal stability, electrolyte tolerance and good resistance to shear and biological degradation. It is even further more desirable that aqueous media thickened with said water-soluble polymers are thickened over a broad range of electrolyte concentration.

SUMMARY OF THE INVENTION

These and other objects of the invention are met by a composition comprising at least one compound defined by the formula:

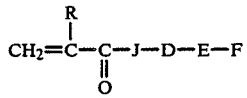

wherein R is hydrogen, $C_{1-4}$ alkyl or a group

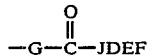

wherein G is a divalent hydrocarbyl linking group and J, D, E and F are as hereinafter defined, wherein J and E independently are divalent linking groups selected from the groups defined as

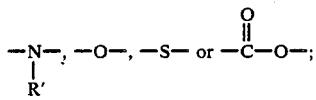

wherein R' is hydrogen or $C_{1-4}$ alkyl; D is a divalent hydrocarbyl group which lends hydrophobicity to the compound; and F is a monovalent hydrocarbyl group which lends hydrophilicity to the compound.

In a further embodiment, the invention comprises a composition comprising the polymerization product of
 (A) one or more water-soluble monomers which are sufficiently water-soluble to form at least a 10 weight percent solution when dissolved in water and which undergo addition polymerization to form polymers which are water-soluble; and
 (B) at least one compound defined by the formula

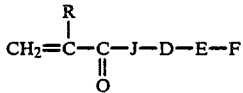

wherein R, J, D, E and F are as defined above.

Aqueous media containing the hydrophobe associated copolymer of this invention can be subjected to substantial mechanical shear without a significant loss of viscosity. This increase in viscosity is particularly enhanced in the presence of a water-soluble electrolyte in the aqueous medium being thickened. Moreover, such hydrophobe associated copolymers provide a substantial viscosity increase even when the aqueous medium is exposed to temperatures up to 80° C. and higher. Consequently, such copolymers may be used for a variety of applications wherein high temperatures, substantial electrolyte concentrations and conditions of high mechanical shear such as in high shear pumping of the aqueous medium, are required.

Because the hydrophilic group in the monomer (B) has its hydrophilic portion distal to the backbone of the polymer rather than proximal to the backbone, the hydrophilic portion may be more easily dehydrated rendering the entire comonomer (B) more hydrophobic. It is believed that as the temperature increases or salt concentration increases, this distal hydrophilic group becomes more dehydrated and thus less hydrophilic, permitting stronger association of the hydrophobic portions of the polymer molecule as the salt concentration increases.

Unlike some high molecular weight polymers currently available which thicken an aqueous media but which also give solutions which are stringy, the copolymers of the invention when dispersed in an aqueous medium, exhibit suitable plastic rheology and short solution characteristics. By "short solution characteristics" is meant that an aqueous medium containing the hydrophobe associated copolymer does not produce threads or strings of such aqueous medium when surfaces wetted with the medium are contacted and pulled apart.

As a result of these and other thickening characteristics of the present invention, these copolymers are useful in applications which require aqueous media having increased viscosity such as drilling mud formulations, fracturing fluids, liquid mobility control agents, aqueous solutions of inorganic salts, hydraulic fluids, lubricants, friction reducing agents, suspending agents, aqueous suspensions of insoluble particulates such as paint formulations and the like.

DETAILED DESCRIPTION OF THE INVENTION

The hydrophobe associative copolymer of this invention is aqueous-soluble, i.e., it is soluble in an aqueous medium consisting of water and 0.2 weight percent of sodium chloride. For the purposes of this invention, a hydrophobic associative copolymer is soluble in the aforementioned aqueous medium if 0.5 weight parts of the copolymer forms a thermodynamically stable solution when it is intimately mixed with 100 weight parts of the aqueous medium. Such solutions form spontaneously in the aqueous medium and include (1) true solutions in which the individual polymer molecules are dispersed as well as (2) micellar or colloidal solutions wherein the polymer molecules are aggregated to some extent, but wherein such aggregates are no larger than colloidal size.

By "hydrophobe associative" it is meant that, in aqueous media, the hydrophobic moieties of the copolymer associate thereby increasing the viscosity of the aqueous medium. Additionally, it is observed that this property of hydrophobe association is even further enhanced by the addition of a water-soluble electrolyte to the aqueous medium. This further enhancement (increase) of viscosity resulting from the addition of the electrolyte may occur in the absence of any precipitation or phase separation. In fact, the occurrence of such precipitation or phase separation upon addition of the electrolyte is preferably not part of the practice of this invention. Use of the polymer of this invention as a thickening agent increases the range of concentration of electrolyte over which such precipitation is likely to not occur.

The copolymer of the invention is predominantly hydrophilic, but contains a sufficient concentration of the comonomer (B) which contains the hydrophobic moieties D to enable it to associate with the hydrophobic moieties of other molecules of the copolymer in an aqueous medium and thus cause an increase in the viscosity of the aqueous medium. The molecular weight of the copolymer is preferably low enough such that an aqueous medium containing 0.1 weight percent of the copolymer can be subjected to a degree of shear on the order of 10,000 sec$^{-1}$ without causing the copolymer to degrade significantly. Moreover, the copolymer preferably has a molecular weight such that, when 0.5 weight part of the copolymer is dissolved in 100 weight parts of water, the Brookfield viscosity of the water is increased to at least 2 centipoises (as measured using a Brookfield LVT viscometer equipped with a UL adaptor and operated at 6 rpm and 25° C.). While copolymers having very high molecular weight, e.g., weight average molecular weight ($M_w$) greater than 5 million, can be suitably employed, such copolymers tend to degrade when subjected to high shear, e.g., in excess of 10,000 sec$^{-1}$. Accordingly such copolymers are less preferred for some applications. Preferably, the copolymers of this invention have weight average molecular weights ($M_w$) as determined by the intrinsic viscosity method described in the examples in the range of from about 200,000 to about 5 million, most preferably from about 800,000 to about 2.5 million.

The hydrophobic groups D of the hydrophobe associative copolymer are divalent hydrocarbyl groups proximal to the backbone of the copolymer or in the monomer are proximal to the ethylenic unsaturation through which the polymerization occurs. By proximal it is meant that the group D is closer than the group F which is distal.

Said proximal organic groups D have hydrophobicities comparable to one of the following: aliphatic hydrocarbon groups having at least 4 carbons such as $C_4$ to $C_{20}$ alkyls and cycloalkyls; polynuclear aromatic hydrocarbon groups such as naphthyls; alkylaryls wherein alkyl has one or more carbons, preferably 4 to 8 carbons; haloalkyls of 4 or more carbons, preferably perfluoroalkyls; polyalkyleneoxy groups wherein alkylene is propylene or higher alkylene and there is at least 1 alkyleneoxy unit per hydrophobic moiety.

The concentration of said hydrophobic moieties in the hydrophobe associative copolymer is that which is sufficient to increase the viscosity of an aqueous medium containing an electrolyte such as sodium chloride in concentration as low as 0.1 weight percent.

Preferably, the concentration of hydrophobic groups in the copolymer is such that, when 0.5 weight part of the copolymer is dissolved in 100 weight parts of the aqueous medium containing at least one weight percent of sodium chloride, the Brookfield viscosity (as defined hereinbefore) of the aqueous medium is substantially higher than, e.g., at least twice that of a similar aqueous medium except that the polymer is identical in all respects to the hydrophobe associative copolymer except that it does not contain monomer units (B). For example, if an aqueous solution containing one weight percent of sodium chloride and one weight percent of polyacrylamide (hydrophilic polymer) has a Brookfield viscosity of 10 cps, the aqueous solution containing one weight percent of sodium chloride and one weight percent of a suitable hydrophobe associative polyacrylamide, e.g., an acrylamide/N-substituted acrylamide wherein the N-substituent (an ethoxylated undecanoic acid) is attached to the N through the carbon ω to the carboxyl group of the undecanoic acid said copolymer having a $M_w$ equivalent to the polyacrylamide, will have a Brookfield viscosity of at least 20 cps.

The hydrophobe associative copolymer is preferably an addition copolymer of a water-soluble ethylenically unsaturated monomer and an amphiphilic ethylenically unsaturated monomer (B) having sufficient concentration of hydrophobic groups to enable the copolymer to associate with the hydrophobic groups of other molecules of the copolymer and sufficient concentration of hydrophilic groups to enable the copolymer to control its hydrophilic-lyophilic balance. Thus, in the absence of electrolyte, the nonionic, hydrophilic groups of the amphiphilic monomeric portion of the copolymer are hydrated, when the copolymer is dispersed in an aqueous medium. However, when electrolyte is then added to the aqueous medium, the hydrophilic groups of the amphiphilic monomer dehydrate and become more hydrophobic.

Exemplary preferred polymers include copolymers of from about 90 to about 99.995, more preferably from about 98 to about 99.9, most preferably from about 99 to 99.5, mole percent of one or more water-soluble monomers with from about 0.005 to about 10, more preferably from about 0.1 to 2, most preferably from 0.5 to about 1, mole percent of one or more amphiphilic monomers (B). For these copolymers, it is found that preferred amounts of amphiphilic monomer will vary with the molecular weight of the copolymer. For example, a hydrophobe associative copolymer of the invention having a weight average molecular weight near 200,000, preferably contains from about 1 to about 2 mole percent of the amphiphilic monomer. Alternatively, the copolymer having a weight average molecular weight of 2 million preferably contains from about 0.02 to about 0.1 mole percent of amphiphilic monomer, preferably from about 0.05 to about 0.1 mole percent. Also, the preferred percentage of amphiphilic monomer varies with the relative balance of hydrophilic moiety F versus the hydrophobic moiety D in the amphiphilic monomer. For example, as the balance shifts from hydrophilic to hydrophobic, generally less amphiphilic monomer is employed. Conversely, if this balance shifts to more hydrophilic, then more of the amphiphilic monomer is required.

Suitable water-soluble monomers (A) include those which are sufficiently water-soluble to form at least a 10 weight percent solution when dissolved in water and readily undergo addition polymerization to form polymers which are water-soluble. Exemplary water-soluble monomers include ethylenically unsaturated amides such as acrylamide, methacrylamide and fumaramide and their N-substituted derivatives such as 2-acrylamido-2-methylpropane sulfonic acid, N-(dimethylaminomethyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid; and other ethylenically unsaturated quaternary ammonium compounds such as vinylbenzyl trimethyl ammonium chloride, sulfoalkyl esters of unsaturated carboxylic acids such as 2-sulfoethyl methacrylate, aminoalkyl esters of unsaturated carboxylic acids such as 2-aminoethyl methacrylate, vinyl amines such as vinyl pyridine and vinyl morpholine, diallyl amines and diallyl ammonium compounds such as diallyl dimethyl ammonium chloride, vinyl heterocyclic amides such as vinyl pyrrolidone, vinylaryl sulfonates such as vinylbenzyl sulfonate as well as the salts of the foregoing monomers. Of the foregoing water-soluble monomers, acrylamide and combinations of acrylamide and acrylic acid, including salts of acrylic acid such as sodium acrylate or ammonium acrylate, are preferred. Acrylamide and combinations thereof with up to 75 mole percent of acrylic acid or salt thereof, based on total water-soluble monomer, are more preferred. Most preferred are polymers wherein the water-soluble monomer is a mixture of acrylamide with from about 5 to about 50 mole percent, especially from about 5 to about 30 mole percent of acrylic acid or salt thereof.

Suitable amphiphilic monomers include those which are ethylenically unsaturated compounds having hydrophobic groups D and hydrophilic groups F as defined hereinbefore. The amphiphilic monomers (B) may have the formula

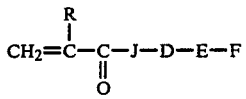    II wherein R is preferably hydrogen or methyl. The symbol J represents a divalent linking group, which may form an ester linkage with J being oxygen or a thioester linkage with J being sulfur, but preferably forms an amide linkage with J being

This R' may be hydrogen or lower alkyl and is preferably hydrogen.

The divalent hydrocarbyl group D which lends hydrophobicity to the amphiphilic monomer (B) is preferably a divalent alkyl chain of 8 to 12 carbon atoms. Other possibilities for this group D are listed hereinbefore.

The divalent linking group E may be an ether or thioether linkage, an ester or thioester linkage or an amide linkage and is preferably an ester linkage

F is a monovalent hydrocarbyl radical which may be selected from hydrophilic moieties such as polyoxyethylenes or polyoxyethylenes with one end capped with a methyl or ethyl group, or F may comprise a polyoxazoline such as poly-2-ethyl-2-oxazoline corresponding to the formula

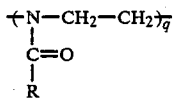    III wherein R is $C_{1-3}$ alkyl and preferably methyl or ethyl and q is 2 to 10. Exemplary polyoxazolines are disclosed in U.S. Pat. No. 3,483,141 which is incorporated herein by reference.

The preferred amphiphilic monomer (B) has the formula

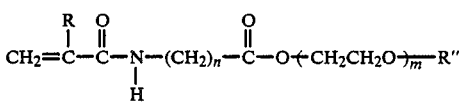    IV wherein R is hydrogen or methyl, R'' is hydrogen, methyl or ethyl, n is from 8 to 12, and m is from 2 to 10. In this monomer J is

D is $(CH_2)_n$; E is

and F is $+CH_2CH_2-O+_mR''$.

Such amphiphilic monomers (B) which have the above-mentioned structure, may be prepared by interfacial condensation of an acrylic acid chloride with an ω-aminoalkanoic acid followed by conversion of the carboxylic acid group to an acid chloride group with thionyl chloride and then reaction with the methyl ether of polyoxyethylene. The same compound could be synthesized by direct coupling of the condensation product of the acrylic acid chloride and the ω-aminoalkanoic acid with the corresponding methyl ether of polyoxyethylene in the presence of a condensing agent such as N,N'-dicyclohexylcarbodiimide.

The aforementioned hydrophobe associative copolymers are advantageously prepared by copolymerizing the water-soluble monomers (A) with the amphiphilic monomers (B) in an aqueous medium which mass contains a chelating agent that complexes with any existing polymerization inhibitors and an emulsifier that solubilizes the amphiphilic monomer in the aqueous medium. The polymerization techniques are typically those wherein the amphiphilic monomer or mixture of amphiphilic monomers is added with vigorous agitation to an aqueous solution of the water-soluble monomer or mixture of water-soluble monomers and solubilizing emulsifier. By solubilizing the amphiphilic monomer in the aqueous medium, it is meant the combination of aqueous medium, amphiphilic monomer and emulsifier gives the visual appearance of a clear solution, preferably, the "solvated" particles of monomer are less than 200 Angstrom units.

Water-soluble monomers such as acrylamide may contain around 20 ppm of copper ion to prevent polymeriation. A chelating agent such as ethylenediamine tetraacetic acid (EDTA), the pentasodium salt of (carboxymethylimino)bis(ethylenenitrilo)tetraacetic acid, tetrasodium ethylenedinitrilotetraacetate or the trisodium salt of N-(carboxymethyl)-N'-(2-hydroxyethyl)-N,N'-ethylenediglycine is then added to the reaction mixture to complex such metallic salts. The copolymerization is then preferably initiated by adding a polymerization initiator capable of generating free-radicals. Optionally, a chain transfer agent may be included in the polymerization reaction mixture.

The solubilizing emulsifier is required in most instances to suitably solubilize the amphiphilic monomer and to subsequently obtain a hydrophobe associative copolymer having a desirable concentration of hydrophobic moieties in the copolymer. It is believed that the amphiphilic monomer is solubilized in the micelles formed by the emulsifier. Thus, the emulsifier is generally employed in an amount which is above the critical micelle concentration (CMC) of the emulsifier, but less than that which reduces the concentration of amphiphilic monomer in the copolymer to a point that the hydrophobic groups of the copolymer will not associate in the presence of the electrolyte. Preferably, the concentration of emulsifier in the aqueous polymerization medium is from about 2 to about 4 times the CMC of the emulsifier.

The amount of emulsifier used will also be such that there is at least one amphiphilic monomer molecule per micelle of the emulsifier, preferably from about 1 to about 10, most preferably from about 2 to about 5, amphiphilic monomer molecules per micelle. For example, when sodium dodecyl sulfate (NaDS) is employed as an emulsifier for dodecyl poly(oxyethylene)$_{10}$ methacrylate (DPMA), the molar ratio of DPMA to NaDS is at least 1:50 up to about 1:2, preferably from 1:5 to 1:25, most preferably about 1:10 to about 1:15.

By knowing the CMC, the hydrophilic-lipophilic balances (HLB) and aggregation number of molecules in the micelle molecular weight of an emulsifier and the hydrophobicity of the amphiphilic monomer, suitable molar ratios and appropriate emulsifier concentrations can be determined for any given amphiphilic monomer and emulsifier to provide similar suitable concentrations of hydrophobic moieties in the hydrophobe associative copolymer. In general, mole ratios which will provide from about 2 to about 10, preferably about 4 to about 5, molecules of the amphiphilic monomer per micelle of emulsifier are selected.

Suitable emulsifiers include anionic agents such as alkali metal salts of alkyl sulfates and alkyl and aryl sulfates, e.g., dodecyl alkyl sulfosuccinates and sodium dodecylbenzene sulfate; fatty acid soaps, e.g., sodium oleate, sodium stearate and potassium oleate; alkali metal salts of sulfonated fatty alcohols, e.g., sodium dodecyl sulfate; sulfates of ethoxylated alcohols; alkyl phosphate esters, e.g., dodecyl hydrogen phosphate; fluoro emulsifiers, e.g., perfluoroalkyl sulfates; and the like.

Also included are cationic emulsifiers such as alkylamine hydrochlorides, e.g., dodecylamine hydrochloride and tridecylamine hydrochloride; quaternary alkyl or aryl ammonium halides such as dodecyl trimethyl ammonium chloride; ethoxylated fatty amines and other emulsifiers as described in *McCutcheon's Detergents and Emulsifiers*, North American Edition, 1980 Annual.

In general, when the copolymer is anionic or nonionic, an anionic emulsifier such as an alkali metal alkyl sulfate is preferably employed as the emulsifier. When the hydrophobe associative copolymer is cationic, a cationic emulsifier such as dodecylamine hydrochloride is employed. When the hydrophobe associative copolymer is nonionic, anionic or cationic, a nonionic emulsifier such as nonylphenoxy polyethylene glycol having 10 ethyleneoxy units per molecule or other water-dispersible nonionic surfactants as defined herein is suitably employed.

The nature of the hydrophilic group F preferably is also taken into account. If F is anionic, the emulsifier should not be cationic. Conversely, when F is cationic, the emulsifier should not be anionic. When using metallic ion inhibited water-soluble polymers one may use chelating agents including those mentioned hereinbefore, with the pentasodium salt of (carboxymethylimino)bis(ethylenenitrilo)tetraacetic acid being preferred. When employed, the chelating agent is used in an amount in the range from about 0.1 to about 0.2, preferably from about 0.1 to about 0.15, weight percent based on the weight of total monomers.

Exemplary suitable polymerization initiators include the inorganic persulfates such as potassium persulfate, ammonium persulfate and sodium persulfate, azo catalysts such as azobisisobutyronitrile and dimethyl azoisobutyrate; organic peroxygen compounds such as benzyl peroxide, t-butyl peroxide, diisopropyl benzene hydroperoxide and t-butyl hydroperoxide. Of these initiators, the oil-soluble types such as the organic peroxides and azo compounds are preferred. It is desirable to employ from about 0.01 to about 0.1 weight percent of initiator based on the weight of total monomers.

The hydrophobe associative copolymers are readily recovered from the aqueous medium when such is desired by conventional techniques including precipitation with organic solvents such as methanol or acetone or removal of water under vacuum or by azeotropic distillation or by drum drying. Alternatively, the aqueous medium containing the hydrophobe associative copolymer can be used as such.

It is also understood that hydrophobe associative copolymers of acrylamide, acrylic acid and the amphiphilic monomer (B) can be prepared by copolymerizing all three of these monomers or by copolymerizing acrylamide with the amphiphilic monomer (B) and subsequently hydrolyzing a portion of the copolymerized acrylamide by contacting the copolymer with a base such as sodium hydroxide and/or sodium carbonate.

The amount of hydrophobe associative copolymer in the aqueous medium being used is sufficient to provide the desired increase in viscosity of the aqueous medium. Preferably, such amounts of copolymer range from about 0.01 to about 1.5 weight percent, most preferably from about 0.05 to about 1 weight percent, based on the aqueous medium.

In addition to the hydrophobe associative copolymer, the aqueous medium may also contain a nonpolymeric, water-soluble electrolyte including salts of monovalent and divalent cations such as ammonium, alkali metal and alkaline earth metal chlorides, bromides, nitrates, sulfates, carbonates, acetates and the like; monobasic and di- and tribasic acids such as hydrochloric acid, sulfuric acid, phosphoric acid and oxalic acid; and monovalent bases such as sodium hydroxide and potassium hydroxide. Such electrolytes may be present in the aqueous media as in the case of brines and other aqueous media containing water-soluble salts of various metals and other water-soluble electrolytes. Such aqueous media often contain from about 0.01 to about 20 weight percent of salts of alkali metals and alkaline earth metals. These electrolytes generally enhance hydrophobe association between hydrophobic groups of the hydrophobe associative copolymer.

In addition to the hydrophobe associative copolymer and electrolyte (salt), the aqueous medium may contain a variety of other ingredients common to mobility control fluids, fracturing fluids, drilling muds, or other additives depending upon the intended use of the aqueous medium. The aqueous medium may also contain various additives such as antioxidants and antimicrobials, stabilizers, fillers and the like.

An exemplary fracturing fluid comprises the aforementioned hydrophobe associative copolymer, a stabilizer (antioxidant) such as a water-soluble thiosulfate; a fluid loss additive such as silica flour or a liquid hydrocarbon; a particulate solid proppant such as sand, bauxite, glass beads; and an energizing gas such as nitrogen or carbon dioxide. In each instance, the proportions of ingredients are the proportions employed in conventional fracturing fluids.

To increase the viscosity of an aqueous medium containing substantial amounts, e.g., up to about 5 weight percent based on the aqueous medium of monovalent inorganic salts such as sodium chloride and up to 1 weight percent, usually from 0.0015 to 0.5 weight percent, of salts of polyvalent cations such as calcium and magnesium, it is preferred to employ (1) as the hydrophobe associative copolymer, (a) a nonionic copolymer of a water-soluble ethylenically unsaturated carboxamide such as acrylamide and IV a methyl poly(oxyethylene)$_m$ amino higher alkyloxyacrylamide, acrylate or methacrylate such as methyl poly(oxyethylene)$_5$ aminoundecanoxy acrylamide or (b) an anionic copolymer of sodium acrylate and IV a methyl poly(oxyethylene)$_m$ amino higher alkyloxyacrylamide, acrylate or methacrylate wherein m is 5 to 10 and alkyl has from 8 to 16 carbon atoms, or (c) an anionic copolymer similar to (b) except that it also includes a water-soluble ethylenically unsaturated carboxamide such as acrylamide.

The viscosity increase in this aqueous medium is retained or increased at temperatures over the range from about 30° C. to about 80° C. In many instances, this viscosity increase is retained at temperatures substantially higher than 80° C.

To increase the viscosity of an aqueous medium at a temperature of 60° C. to 80° C. and containing from about 10 to 15 weight percent of a monovalent salt, it is preferred to use one of the aforementioned or nonionic or anionic copolymers containing a monomer IV wherein m is 10 to 20, e.g., a dodecyl poly(oxyethylene)$_{10}$ methacrylate. In contrast, to increase the viscosity of an aqueous medium at an ambient temperature and containing from about 0.1 to about 0.5 weight percent of monovalent salt, it is preferred to employ one of the aforementioned nonionic or anionic copolymers containing a monomer IV wherein m is 6 to 12. To increase the viscosity of an aqueous medium containing from about 1 to about 5 weight percent of salts of polyvalent cations, e.g., calcium and/or magnesium in the form of salts such as calcium bromide, calcium chloride or magnesium sulfate, it is preferable to employ one of the aforementioned nonionic copolymers containing a monomer IV wherein m is 20 to 40, e.g., copolymer of acrylamide and dodecyl(polyoxyethylene)$_{20}$ methacrylate.

In general, the type of application and the conditions characteristic of the application will determine the number of carbons in the hydrophobic moiety and the value of m for the amphiphilic monomer employed, to give the desired viscosity response. For example, it is found that an amphiphilic monomer having a value of m of 5–10 and a C$_{12}$–C$_{16}$ alkyl group is advantageously employed in an aqueous medium having a relatively low salt concentration and moderate temperature. On the other hand, an amphiphilic monomer having an m value of 10–40 and C$_6$–C$_{10}$ alkyl as the hydrophobic group is employed in an aqueous medium having a relatively high salt concentration and high temperature. Moreover, the desired viscosity response for a given set of conditions can be achieved by using a single amphiphilic monomer or a mixture of amphiphilic monomers which combine to provide the desired properties.

The following examples are given to illustrate the invention and should not be construed as limiting its scope. Unless otherwise indicated, all parts and percentages are by weight.

EXAMPLE 1

Preparation of methyl(polyoxyethylene)$_5$-aminoundecanoxy methacrylamide wherein R is CH$_3$, J is

D is (CH$_2$)$_{11}$, E is

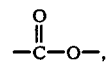

and F is $-(CH_2CH_2O)_5CH_3$

In a 500-cm$^3$ three-necked reaction flask equipped with mechanical stirrer, condenser and dropping funnel, 40 g of amincundecanoic acid (0.2 mole) is added to a solution of 10 g of sodium hydroxide in 160 cm$^3$ of water. A solution of 41 g of methacryloyl chloride and 100 cm$^3$ of methylene chloride is added in portions with vigorous stirring. The reaction flask is cooled with ice water to keep the temperature about 10° C.–15° C. This stirring is continued for 4 hours after the addition is completed. After the 4 hours, the phases are allowed to separate and the organic phase is collected. The aqueous phase is washed with a small amount of methylene chloride and the methylene chloride solution is added to the already separated organic phase. Upon removal of the methylene chloride, a colorless solid with a strong methacrylic acid smell is left. This solid phase is washed several times with water and dried under vacuum at room temperature. The product is identified as aminoundecanoic acid methacrylamide by nuclear magnetic resonance and infrared. It has a melting point of 52° C.–53° C., yield is 25 g (46 percent).

The entire yielded product is dissolved in 100 cm$^3$ of methylene chloride. Under exclusion of moisture, 10 cm$^3$ of thionyl chloride is added to the solution. An exothermal reaction is observed. Upon subsidence of the exothermicity, the solution is heated at 50° C. for 3 hours. Any remaining thionyl chloride and solvent is removed, first by water aspirator vacuum (with dry ice cooled condenser in between), then by vacuum pump to give a yellow-colored liquid. The formation of the acid chloride is confirmed by determining the shift of the α-methylene proton from 2.35 ppm to 2.90 ppm in nuclear magnetic resonance.

The aoid chloride obtained is without further purification dissolved in 70 cm$^3$ of dry tetrahydrofuran. To this solution, which is cooled in ice, 45 g of methyl polyoxyethylene ether with an average of five ethoxy groups per molecule dissolved in 50 cm$^3$ of tetrahydrofuran and 20 cm$^3$ of pyridine is added dropwise. Stirring is continued under cooling for 2 hours after addition. The pyridinium salt is filtered. The filtrate is vacuum dried at 40° C. and 5 mm Hg pressure to give a dark yellow viscous liquid. The formation of the ester is identified by the appearance of (A) multiplied at δ equals 4.20 ppm in nuclear magnetic resonance. Yield of product is about 64 g. This is an example of amphiphilic monomer (B) which is used in all the polymer examples.

EXAMPLE 2

Preparation of the polymers

Terpolymers of acrylamide, acrylic acid and amphiphilic monomer (B) are carried out by the following procedure. In a 300-cm$^3$ citrate bottle, a weighed quantity of amphiphilic monomer (B), which is not soluble in water, is mixed with 25 g of 10 percent aqueous solution of sodium lauryl sulfate. A clear solution results. The stated amounts of acrylic acid titrated with sodium hydroxide to a pH of 4.5 and acrylamide are added to this solution. The total quantity of monomers amounts to 25 g in each sample of polymer made. To each mixture of monomers, 1.8 g of 2 percent aqueous VERSENEX ® 80 (trademark of The Dow Chemical Company) and 2 g of 2 percent of VASO ® 64 dissolved in t-butanol are added and each sample is brought up to 250 g with deionized water. The bottle is purged with nitrogen and degassed with a water aspirator three times. The citrate bottle is then sealed with a Teflon-lined cap and heated in a tumbler at 60° C. for 16 hours.

For purposes of comparison, water-soluble polymers of the water-soluble monomers which polymers do not contain the amphiphilic monomer (B) are prepared according to the foregoing procedure except that the amphiphilic monomer is omitted.

Each of the aforementioned compositions is diluted with deionized water to form a stirrable solution and stirred for 24 hours to obtain a uniform solution. The solution is then adjusted to pH of 7.5 with a 2 percent sodium hydroxide solution and then diluted with deionized water to polymer concentration of about 0.3 percent, unless otherwise noted. The solution is maintained at 23° C. for 3-4 hours to reach equilibrium.

A solution of each of the copolymers and a water-soluble electrolyte is prepared by dissolving a specified amount of sodium chloride or other electrolyte in the aforementioned composition solution and then maintaining the solution for 2-3 hours to allow it to reach equilibrium.

The viscosity of all the solutions is measured with a Brookfield Synchro-lectric LVF viscometer at 6 rpm.

The molecular weight of these polymers is determined to be about 3 times 10$^6$ in aqueous solution containing 3 weight percent sodium chloride and 1.5 weight percent C$_8$H$_{17}$(OC$_2$H$_4$)$_5$—OH nonionic surfactant by measuring the intrinsic viscosity. The following Mark-Houwink equation was used:

$$(\eta) = 6.31 \times 10^5 (M)^{0.80}$$

Compositions of the copolymers tested are listed in Table I.

TABLE I

|  | Acrylamide (g) | Acrylic Acid (g) | Monomer B (g) |
|---|---|---|---|
| Comparison A | 18.69 (75) | 6.31 (25) | 0 |
| Example 2 | 18.28 (74.7) | 6.27 (25) | 0.52 (0.3) |
| Example 3 | 18.02 (74.5) | 6.13 (25) | 0.85 (0.5) |
| Example 4 | 17.39 (74.0) | 5.95 (25) | 1.66 (1.0) |

The numbers in parentheses indicate mole percents.

Viscosities of copolymer solutions and the copolymers in conjunction with saline solutions are set out in Table II.

TABLE II

|  | Weight Percent Sodium Chloride | | | | |
|---|---|---|---|---|---|
|  | 0 | 1 | 2 | 4 | 6 |
| Comparison A | 975 | 25.0 | 17.5 | 13.5 | 12.5 |
| Example 2 | 825 | 24.0 | 17.5 | 15.5 | 21.5 |
| Example 3 | 875 | 32.5 | 25.5 | 24.0 | 33.5 |
| Example 4 | 975 | 100 | 95 | 105 | 155 |

What is claimed is:

1. A composition comprising a polymerization product of
   (A) one or more water-soluble monomers which are sufficiently water-soluble to form at least a 10 weight percent solution when dissolved in water and which undergo addition polymerization to form polymers which are water-soluble; and
   (B) at least one compound defined by the formula

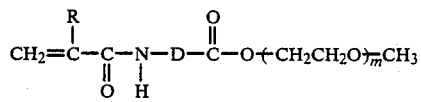

wherein R is hydrogen or C$_{1-4}$ alkyl, D is a C$_{8-12}$ divalent alkyl group and m is 2-10 wherein said polymerization product is aqueous-soluble.

2. The composition of claim 1 which has a viscosity significantly greater than a composition the same in all respects except that there is no inorganic salt in the solution.

3. The composition of claim 1 wherein the polymer contains sufficient hydrophobic moieties D to render the polymer hydrophobe associative in aqueous media.

4. The composition of claim 3 wherein the polymer has a weight average molecular weight of from about 800,000 to about 2.5 million as determined by intrinsic viscosity.

5. The composition of claim 4 wherein the water-soluble monomers are acrylamide, acrylic acid, salts of acrylic acid or mixtures thereof.

6. The composition of claim 5 wherein the water-soluble monomer is a mixture of acrylamide and acrylic acid or salts of acrylic acid with about 5 to about 30 mole percent acrylic acid or salts of acrylic acid in the mixture.

7. The composition of claim 6 wherein compound (B) comprises from about 0.1 to about 2 mole percent of the polymer.

8. The composition of claim 7 wherein R is hydrogen.

9. The composition of claim 1 wherein the polymerization product will not form gels as a result of precipitation by electrolytes over a wider range of electrolyte concentration than a second polymer identical to the polymerization product except that D is distal to the polymer backbone and —(CH$_2$CH$_2$O)$_m$CH$_3$ is proximal to the polymer backbone.

10. The composition of claim 1 wherein —(CH$_2$CH$_2$O)$_m$CH$_3$ is capable of hydrating in aqueous media and is capable of dehydrating with a temperature increase or an increase in electrolyte concentration.

* * * * *